(No Model.)　　　　　　S. W. LUDLOW.　　　　4 Sheets—Sheet 2.
STEAM ENGINE.

No. 306,410.　　　　　　　　　　Patented Oct. 14, 1884.

Attest　　　　　　　　　　　　　　Inventor
Walter Chamberlin　　　　　　　Samuel W. Ludlow
O. M. Hill　　　　　　　　per Wm. Hubbell Fisher
　　　　　　　　　　　　　　　　Atty (No Model.) 4 Sheets—Sheet 3.
S. W. LUDLOW.
STEAM ENGINE.
No. 306,410. Patented Oct. 14, 1884.
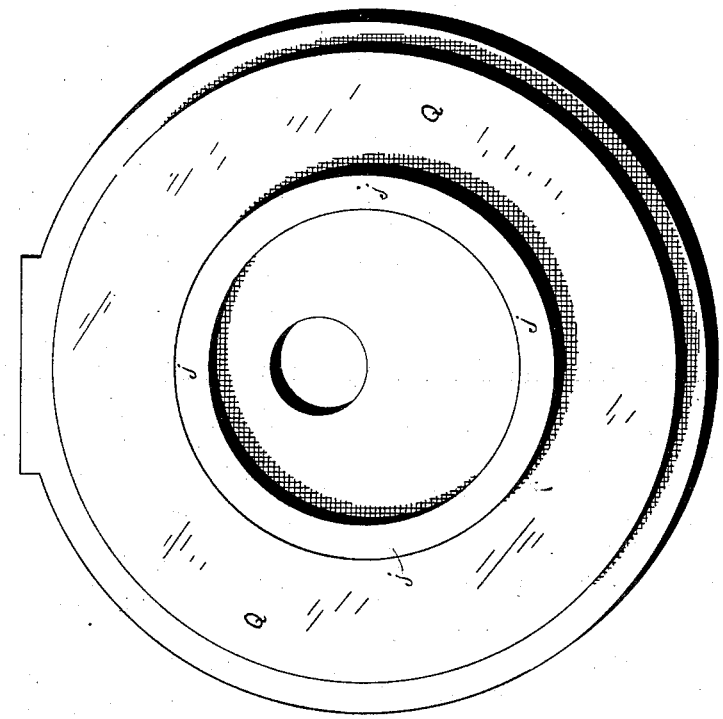
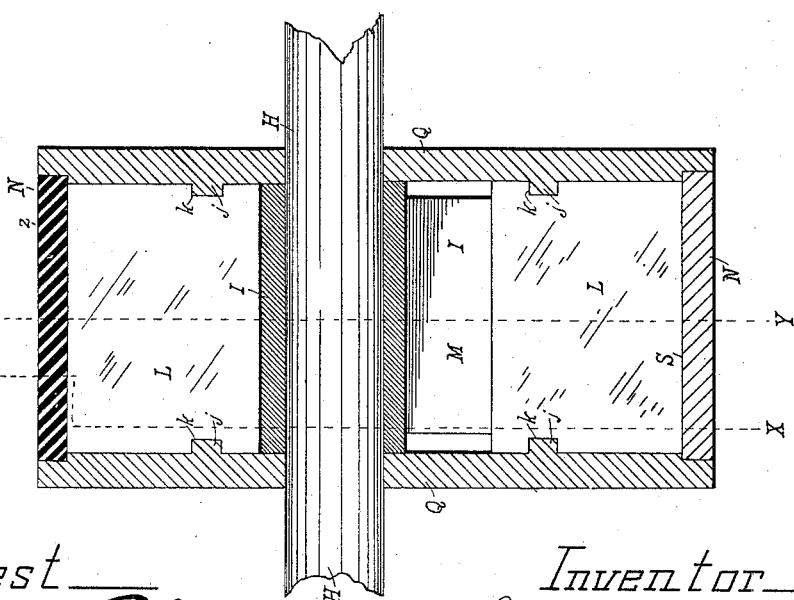

(No Model.) 4 Sheets—Sheet 4.
S. W. LUDLOW.
STEAM ENGINE.
No. 306,410. Patented Oct. 14, 1884.
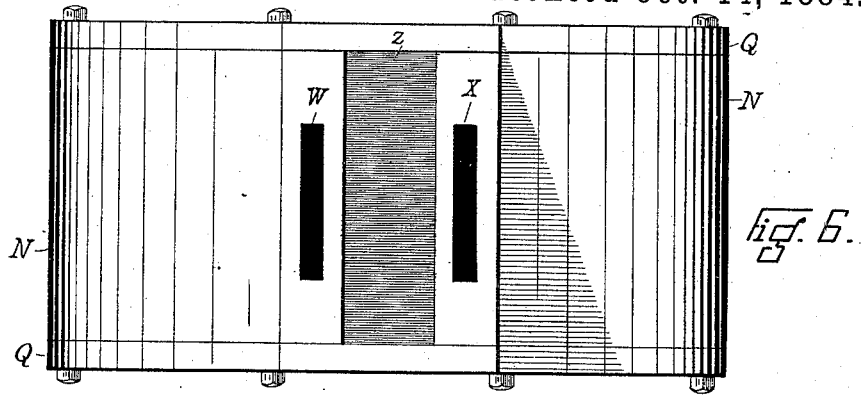
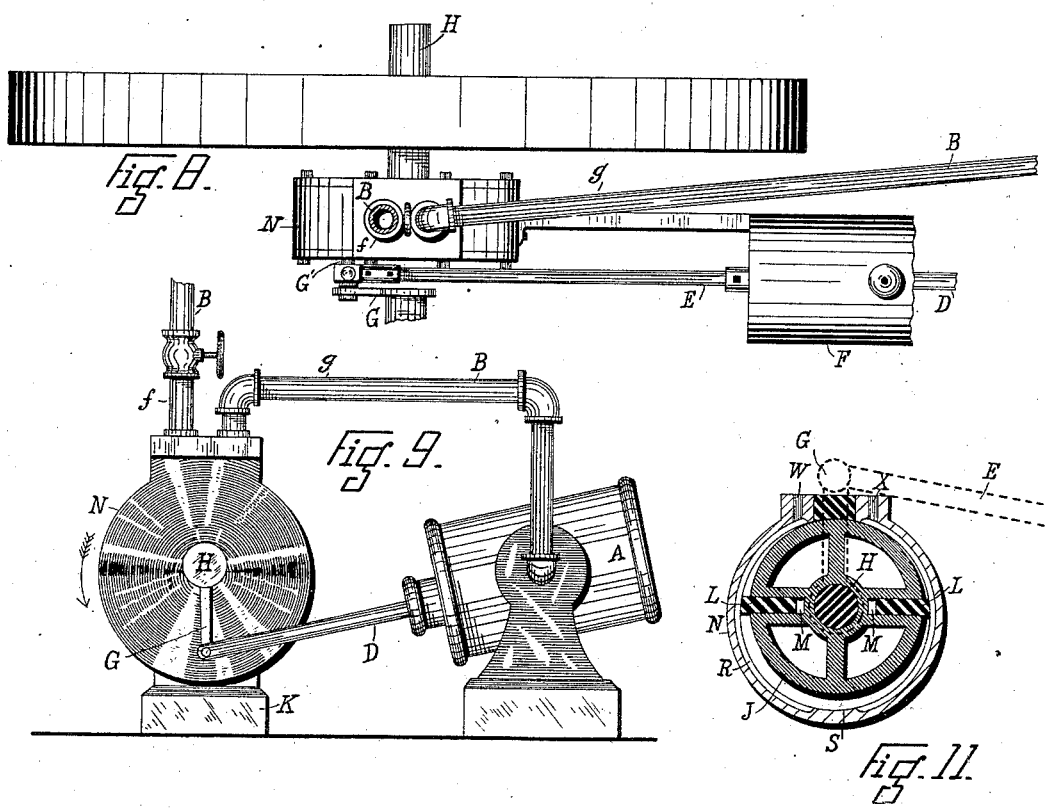
Attest
Walter Chamberlin
O. M. Hall
Inventor
Samuel W. Ludlow
per Wm. Hubbell Fisher,
Atty
N. PETERS. Photo-Lithographer. Washington. D. C.

UNITED STATES PATENT OFFICE.

SAMUEL W. LUDLOW, OF CINCINNATI, OHIO.

STEAM-ENGINE.

SPECIFICATION forming part of Letters Patent No. 306,410, dated October 14, 1884.

Application filed February 12, 1884. (No model.)

*To all whom it may concern:*

Be it known that I, SAMUEL W. LUDLOW, of the city of Cincinnati, in the county of Hamilton and State of Ohio, have invented certain new and useful Improvements in Steam-Engines, of which the following is a specification.

My invention is applicable to that class of steam-engines which employ a reciprocating piston, and which are provided with means for converting a rectilinear motion into a curvilinear or rotary one.

One of the principal objects of my invention is to provide means whereby the force of steam or other fluid employed to operate the engine shall directly and positively operate to carry the crank-shaft past the dead-points of the piston-stroke without waste of steam.

The various features of my invention and the several advantages resulting from their use conjointly or otherwise will be apparent from the following description.

Figure 1:
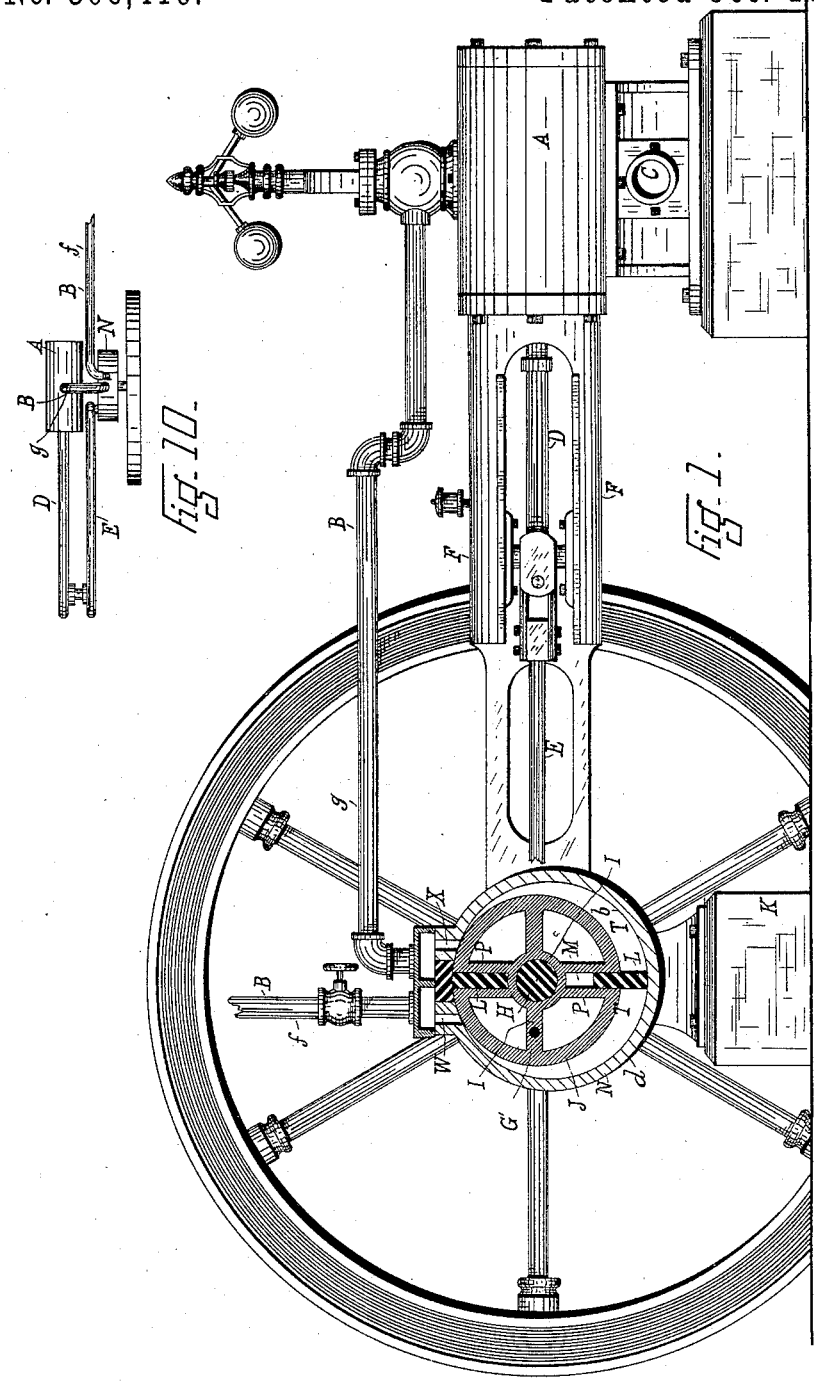
Figure 2:
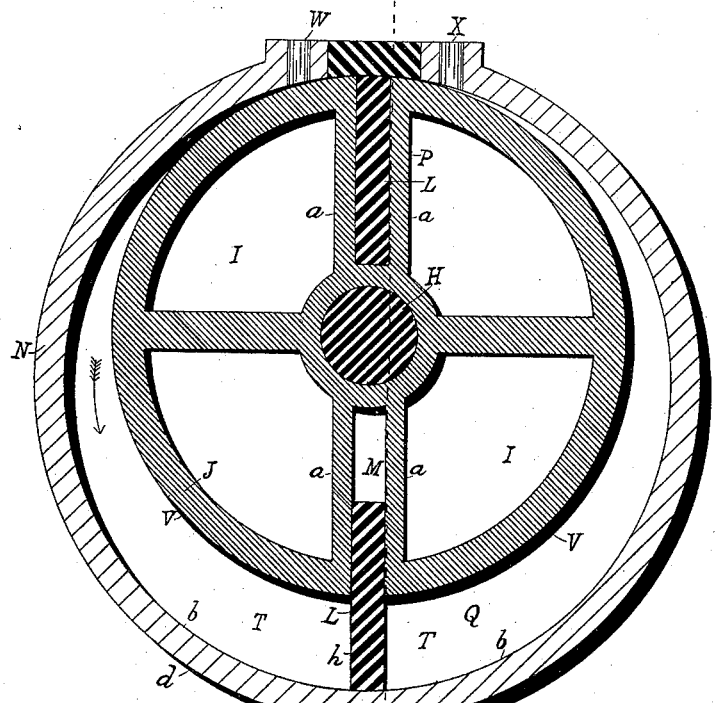
Figure 3:
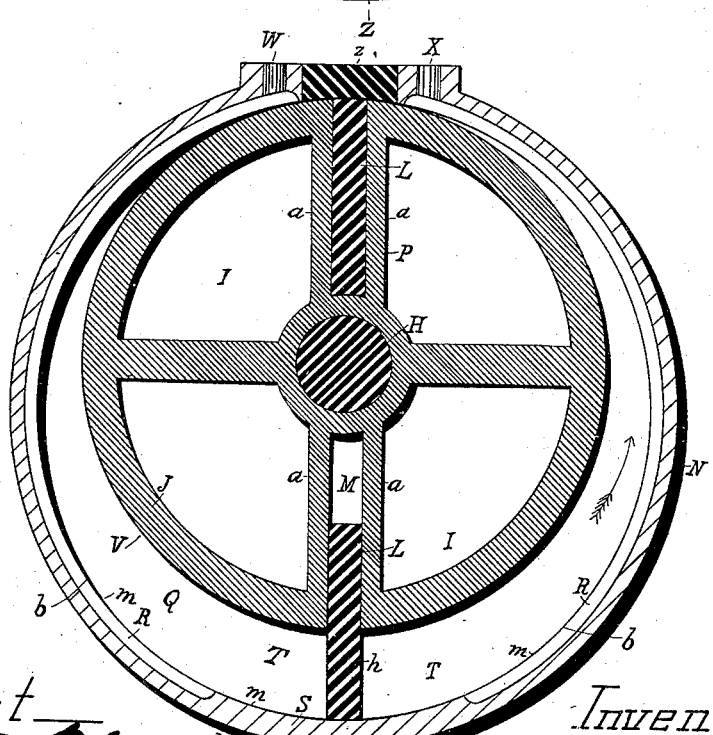

In the accompanying drawings, Figure 1, Sheet 1, represents a side elevation of one of the various engines which can be employed in connection with my invention, and showing a vertical central section of a device illustrating certain features of my invention, said section being taken transversely to the length of the crank-shaft. Fig. 2, Sheet 2, is a vertical section of a portion of the device, illustrating certain features of my invention, said section being taken at the plane through the dotted lines X X, shown in Fig. 4. Fig. 3, Sheet 2, is a vertical section of the device shown in Fig. 2, said last-named section being taken in a plane through the dotted lines Y Y of Fig. 4. Fig. 4, Sheet 3, is a transverse vertical section of the same device, said section being taken at the dotted line Z Z of Fig. 2, looking from right to left, and showing the parts in the same position as they occupy in Fig. 1, the crank-shaft being in elevation. Fig. 5, Sheet 3, represents in side elevation a preferred form of the lid of the same device. Fig. 6, Sheet 4, represents the top of the steam-ports of the device shown in Figs. 2, 3, and 4. Fig. 7, Sheet 4, represents a cross-section of the side of the outer cylinder of the device shown in Figs. 2, 3, and 4, and illustrating the general preferred form of recess in said side.

Fig. 8 represents a top view of a portion of the engine and its connection (shown in Fig. 1) with the main cylinder (its own valve mechanism, together with a part of the piston-rod, slides, and feed-pipe being omitted.) Fig. 9 illustrates in side elevation a mode of applying certain features of my invention to an oscillating engine. Fig. 10, Sheet 1, represents a top view (diminished) of an engine with my invention applied thereto. Fig. 11 is a sectional elevation of my auxiliary device, and showing in dotted lines a crank and pitman of a main reciprocating engine, the crank being attached to the same shaft as the inner portion of the auxiliary device, and showing the preferred position of the crank in relation to the auxiliary device.

A indicates a cylinder having a reciprocating piston, the cylinder and piston being of any preferred construction.

B indicates the feed-pipe for admitting the steam to the cylinder.

C indicates the exhaust-orifice of said cylinder, of any desired form.

The valve and valve-chest for regulating the admission of steam to the cylinder are of any preferred construction, and are not herein shown for the reason that they constitute no essential portion of my invention. In Fig. 1 the valve-chest may be understood to be located on that side of cylinder A which is farthest from the spectator, and which is out of sight. The piston carries a piston-rod, D, connected pivotally in any desired way at its outer or free end to one end of a pitman, E, and usually working in guides F or equivalent supports. The other end of the pitman is pivotally connected to the free end of a crank-arm or crank-disk, G, in a suitable manner, as by a wrist, G′, and the other end of the crank is rigidly attached to the crank-shaft H. In stationary engines this shaft H will usually carry a heavy fly-wheel and suitable means for transmitting power to the machine or machinery to be operated. In locomotive-engines this shaft will operate the driving-wheels in any desired manner.

On shaft H is rigidly fixed a frame, I, in which are located sliding pistons. Both the frame and pistons are inclosed in a box or cylinder, N, upheld by any suitable support, one form of such support being shown, as indicated by K, on the drawing, Fig. 1. The frame I is preferably of a cylindrical form, J. Preferably sliding pistons are employed, and the periphery of this cylindrical frame I is on opposite sides of the driving-shaft opened or separated, forming a space to allow a sliding piston, as L, to operate in each of said openings or separations M. The periphery of this cylinder J constitutes a wall, V, on the inner side of the steam-space in the box or cylinder N.

Each of the openings in frame I is provided with suitable guides for guiding the sliding pistons. In the present instance these guides P consist of pieces a, adjacent but separated and parallel to one another, and between these adjacent pieces slides a piston, L. The guides are suitably supported, preferably, by being connected to the frame I, as shown. Preferably there are two pistons, one of these being located at one side of the driving-shaft and the other at the other side of the driving-shaft. Preferably these pistons occupy the position of radii from the shaft; but such position is not necessary so long as they act to obstruct the steam-passage in the cylinder or box during a proper part of the revolution of the driving-shaft, and then operate as a piston to rotate the shaft through the agency of frame I. The interior surface of the side d of the outer box or cylinder, N, is circular at its edges b. The inner portion of its wall or side d is provided with recesses R, separated by the surface S, which, continuing and coincident with the circular conformation of said edges b, is flush with them. The cylinder J is concentric with the driving-shaft H, and the cylinder N is eccentric with said shaft; hence a steam-space, as T, is present between the peripheral surface of the wall V of cylinder J and the inner surface of wall or side m of cylinder N. The cylinder N is provided with a suitable steam-inlet orifice, W, and suitable steam-outlet orifice, X. The inlet and outlet orifices are preferably located as shown. Steam from the boiler or other supply enters the cylinder N by passing through that length or section of the feed-pipe B of cylinder A which is denominated by the letter f, and then passing through the inlet W. The ends of cylinder J are suitably packed, so as to prevent steam after entering the steam-space T to escape across the ends of the cylinder J from one side to the other, the packing serving to confine the steam to the steam-space between the outer (or peripheral) side of cylinder J and the inner side of cylinder N. The space z, between the inlet and exit ports, is also preferably packed, the packing bearing against the periphery of cylinder J and preventing steam from crossing said space z from one port to the other. The sliding pistons are arranged so as to bear against the inner surface, S, of the side of the cylinder N, and there form a steam-tight joint. The side edges, h, of these pistons also form a tight joint with ends Q of cylinder N.

A preferred means of longitudinally advancing and retracting the pistons L L consists as follows: On the inner side of each end W of the cylinder N is an annular flange, ring, or bead, j, projecting toward the opposite end of said cylinder. This bead j is concentric with cylinder N. In the end of each piston is a groove, k, and the adjacent bead j enters said groove. As the shaft H revolves and rotates cylinder J, the sliding pistons are also carried around and operated upon by the beads j, eccentric to cylinder J, and are thus caused to slide in or out and to always bear against the inner side of cylinder N. The surface S of cylinder N is located in the steam-space T. The cylinder J is so placed on the shaft H in relation to the stroke of the piston D that when the crank F is passing its dead-points one of the pistons L shall be in contact with the surface S and operating to turn the driving-shaft H.

A preferred form of construction to carry out this purpose is as follows: The cylinder J is affixed to the shaft H so that the pistons L shall advance and retract in lines, situated on radii of shaft H, substantially at right angles to the radius which coincides with the crank-shaft F, and the surface S be at that portion of the arc of the cylinder N which is included between three radii of shaft F, which include an arc where the crank exerts its greatest power, the piston of the main cylinder passing through the middle portion of its stroke.

A short description of the mode in which the engine operates is as follows: Suppose the main engine to be in the middle of the stroke, for example, as in Fig. 9. Steam being admitted to the section f of feed-pipe B, the steam enters the cylinder N through inlet W, and, passing through the adjacent recess R into steam-space T, then passes under the free end of first piston L, and thence into steam-space T beyond this first piston, then passes through second recess R under the free end of the second piston, and then passes out of exit-orifice X into section g of feed-pipe B, and, passing through this pipe and through a suitable valve, passes into the main cylinder A, and acts upon the piston, driving the latter forward—say, for example, in the direction of the arrow—the steam from the boiler having in the meanwhile unobstructed passage through the cylinder N by means of recess R. It will thus be seen that the reciprocating engine is supplied with steam under full boiler-pressure, passing through the cylinder of the rotary engine, in which it has not been expanded, but in its passage therethrough has imparted the force of the velocity and the pressure under which it is discharged from the boiler to the crank-shaft to assist the reciprocating engine in passing its dead-points. As the piston of main cylinder nears the left-hand end of its stroke and the crank is nearing its dead-point, the first piston L comes onto the broad unrecessed surface S of cylinder N and instantly cuts off communication between the pipe $f$ and the main cylinder A. The full pressure of steam from pipe $f$ is now exerted upon the piston L and operates to move the piston L forward, thereby turning the driving-shaft H and carrying the engine past what would otherwise be the dead-point of its crank center, and carrying the free end of the crank some distance past the said dead-point. This first piston L then leaves the surface S and the live steam again rushes under its free end and into the cylinder A—viz., at the other end of the cylinder A from what it entered before—and drives the piston of this main cylinder back. As it has completed one-half of its stroke in going back, the second piston L will take the place which the first one occupied in Fig. 1, and the first piston will take the place occupied by the second piston in said figure. As the piston of cylinder A is approaching the right-hand end of its stroke, the second piston L will reach surface S and again obstruct the passage of live steam to cylinder A, whereupon the live steam will operate upon this second piston L and move it forward, thus turning shaft H and carrying the crank past its right-hand dead-point, and to a position where the live steam will again act upon the main piston of cylinder A and operate to move it (said main piston) forward on its next stroke. Thus the cylinder N and pistons L and cylinder J on the one hand, and the cylinder A on the other hand, supplement each other in the work of turning the shaft H, the piston of the cylinder A operating when its power can be best exerted—viz., when the crank is moving between the dead-points of its revolution—and the pistons L during all or a greater portion of this time remaining idle, and one of the pistons L operates to turn the shaft H when the crank has reached or nearly reached a point where the main piston has no longer any appreciable power to rotate the said shaft H. The length of the surface S is to be extended or shortened, as desired. It may also be so placed that one of the pistons L shall reach the surface S just at and not before the piston of the main cylinder A has reached its dead-point, and shall leave the said surface S very quickly afterward; but I prefer that the live steam shall operate to actively move a piston L and through said piston turn the shaft H while the piston of main cylinder is approaching the end of its stroke and the crank is passing the dead-point of its revolution, and until the piston of the main cylinder is well started again on its stroke. Ordinarily the entrance of steam into the steam-port and into the cylinder A against the piston of said cylinder will for a short period diminish the pressure of steam in section $g$ of feed-pipe B, and enable the greater pressure of steam in section $f$ of the feed-pipe B to be exerted so as to positively operate a piston L and turn shaft H while said piston L is in contact with surface S. When desired, however, valve mechanism regulating the admission of steam into the main cylinder A may have a lead or exhaust, or both, so that when the piston in the main cylinder is at the end of the stroke the amount of steam-pressure in the section $g$ of feed-pipe B shall be much less than in the section $f$ of the feed-pipe B, so that almost all of the pressure of the said live steam in section $f$ shall be exerted upon a piston L during the time it is passing surface S.

For the purposes of enabling the pistons L to properly operate when the engine is reversed, a suitable reversing-valve may be employed in connection with ports W and X, and the valve may be operated by the same mechanism whereby the valve of cylinder A is reversed.

The reversing-valve employed in connection with ports W and X may be constructed so that when the engine is reversed the steam from pipe-section $f$ shall be conducted to port X, thus making this the inlet-port, and the pipe-section $g$ shall be connected to port W, thus making this latter an exit-port. The shaft H and the pistons L with cylinder J will then move in a contrary direction; but the principle upon which the engine and its connections are operated will be the same as that upon which said engine and connections are operated before its reversal.

When desired, the crank-shaft with cylinder N may be in the vicinity of the cylinder A and the pitman E run parallel with piston-rod D, as shown in Fig. 10; also, as heretofore suggested, the engine may be an oscillating one, as illustrated in Fig. 9.

When desired, the recesses R may be in the end or ends Q of cylinder N instead of in its side. Of course the particular construction of the rotary auxiliary device for carrying the driving-shaft past the dead-points of action of the reciprocating piston of the main cylinder may be varied and yet come under certain of the broad features of my invention.

While the various portions of my invention are preferably employed together, one or more of them may be employed without the remainder, and one or more of said features may be employed, so far as applicable, in connection with engines other than those particularly herein described.

I do not herein claim the special construction of the rotary engine shown, but reserve the right to make it subject-matter of another application for Letters Patent.

What I claim as new and of my invention, and desire to secure by Letters Patent, is—

1. The combination of a reciprocating engine and a rotary auxiliary device connected to the driving-shaft of the main engine, the motive-fluid supply of the former being fed through the latter under its initial pressure, substantially as described.

2. The combination of a reciprocating engine and a rotary auxiliary device connected to the shaft of the main engine, the steam-supply of the former being fed through the latter and imparting power thereto to assist the former over its dead-points without being subjected to expansion, substantially as set forth.

3. The combination of a reciprocating engine and a rotary device connected to a common shaft, the latter having a portion of its inner wall cut away to admit of the motive fluid passing therethrough under its initial pressure to supply the main engine, and provided with a bearing-surface for the pistons to act upon while the crank of the main engine is passing its dead-points, substantially as shown.

4. The combination of a reciprocating engine and a rotary device connected to a common shaft, the latter having a bearing-surface for the piston, to receive the motive fluid under pressure, and channels through which the fluid in passing to the main engine under its initial pressure imparts its velocity to the piston, substantially as described.

5. The combination of the main cylinder having a reciprocating piston, and an auxiliary cylinder located at or near the rotary driving-shaft, and containing a piston or pistons connected to said driving-shaft, for enabling the live steam fed to the main cylinder under boiler-pressure to operate the piston or pistons of said auxiliary cylinder and carry the crank past the dead-points of the stroke of the piston of the main cylinder, substantially as and for the purposes specified.

6. The combination of a reciprocating and a rotary engine operating a common driving-shaft, the auxiliary piston or pistons receiving steam from the feed-pipe B, on its way to the main cylinder under boiler-pressure, and operating to turn the driving-shaft when the piston of the principal cylinder is at or near the end of its stroke, substantially as and for the purposes specified.

7. The combination of the main cylinder having reciprocating piston, and crank F and driving-shaft H, and an auxiliary cylinder having piston or pistons for the purposes mentioned, the said auxiliary cylinder forming a part of the feed-pipe B, which supplies the main cylinder with steam under boiler-pressure, for enabling the live steam passing through pipe B and said auxiliary cylinder to rotate the driving-shaft past the dead-points in the arc of the revolution of the crank, substantially as and for the purposes specified.

8. The combination of main cylinder A, and crank F, and driving-shaft H, and frame I, attached to said shaft, and carrying sliding pistons L, and the inclosing-cylinder N, provided with recesses R and surface S, and ports W and X, substantially as and for the purposes specified.

9. The combination of main cylinder A, and crank F, and driving-shaft H, and frame I, attached to said shaft, and carrying sliding pistons L, and the inclosing-cylinder N, provided with recesses R and surface S, and ports W and X, connected, substantially as described, to the sections of the feed-pipe B, which latter supplies the main cylinder with steam under boiler-pressure, substantially as and for the purposes specified.

SAMUEL W. LUDLOW.

Witnesses:
W. E. BASSETT,
JNO. W. STREHLI.